(12) United States Patent
Shim et al.

(10) Patent No.: US 11,149,866 B2
(45) Date of Patent: Oct. 19, 2021

(54) DISCHARGE VALVE

(71) Applicants: Hyundai Motor Company, Seoul (KR); Kia Motors Corporation, Seoul (KR)

(72) Inventors: Hyo Sub Shim, Gyeonggi-do (KR); Hak Yoon Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/008,099

(22) Filed: Aug. 31, 2020

(65) Prior Publication Data

US 2021/0180707 A1 Jun. 17, 2021

(30) Foreign Application Priority Data

Dec. 16, 2019 (KR) .................. 10-2019-0168235

(51) Int. Cl.
| | |
|---|---|
| *F16K 31/06* | (2006.01) |
| *F16K 15/18* | (2006.01) |
| *F16K 15/14* | (2006.01) |
| *H01M 8/04746* | (2016.01) |
| *H01M 8/04089* | (2016.01) |

(52) U.S. Cl.
CPC .......... *F16K 15/185* (2013.01); *F16K 15/144* (2013.01); *F16K 31/0672* (2013.01); *H01M 8/04089* (2013.01); *H01M 8/04753* (2013.01)

(58) Field of Classification Search
CPC ............. F16K 17/0486; F16K 31/0655; F16K 31/0672; F16K 31/0686–0693
USPC ........................................ 251/129.15–129.22
See application file for complete search history.

(56) References Cited

U.S. PATENT DOCUMENTS

| | | | | |
|---|---|---|---|---|
| 7,828,265 | B2* | 11/2010 | Sisk ................... | F16K 31/0655 |
| | | | | 251/129.19 |
| 8,215,611 | B2* | 7/2012 | Scudamore ......... | F16K 31/0655 |
| | | | | 251/129.19 |
| 2009/0212248 | A1* | 8/2009 | Kozak ................ | F16K 31/0672 |
| | | | | 251/129.17 |
| 2016/0169404 | A1* | 6/2016 | Choi .................... | F16K 31/408 |
| | | | | 251/129.15 |

* cited by examiner

*Primary Examiner* — Kevin F Murphy
(74) *Attorney, Agent, or Firm* — Mintz Levin Cohn Ferris Glovssky and Popeo, P.C.; Peter F. Corless

(57) ABSTRACT

A discharge valve is provided in a recirculation line through which gas discharged from a fuel cell stack recirculates to the stack. The discharge valve opens or closes a discharge line through which a fluid in the recirculation line is discharged. The discharge valve includes a valve body connected to the discharge line and a drive part disposed in the valve body to be movable vertically. A diaphragm is coupled to a lower end of the drive part and selectively opens or closes the discharge line based on the vertical movement. The drive part switches between a closed state in which the discharge line is closed by the diaphragm, a first opened state in which the discharge line is opened to a first opening degree, and a second opened state in which the discharge line is opened to a second opening degree greater than the first opening degree.

7 Claims, 6 Drawing Sheets

DISCHARGE VALVE

CROSS-REFERENCE TO RELATED APPLICATIONS

This application claims priority to and the benefit of Korean Patent Application No. 10-2019-0168235 filed on Dec. 16, 2019, the entire contents of which are incorporated herein by reference.

TECHNICAL FIELD

The present disclosure relates to a discharge valve, and more particularly, to a discharge valve provided to release overpressure without a separate relief valve.

BACKGROUND ART

A fuel cell system refers to a system that produces electrical energy through a chemical reaction between hydrogen supplied to a fuel cell stack and oxygen in the air. The fuel cell system is applied to fields of hydrogen vehicles (hydrogen fuel cell vehicles). FIG. 1 illustrates an example of a fuel cell system 10 of the related art. Referring to FIG. 1, the fuel cell system 10 includes a fuel cell stack 20, a compressor (not illustrated) configured to compress air and supply the compressed air to the fuel cell stack 20, and a hydrogen supply unit 30 configured to supply hydrogen to the fuel cell stack 20. The air compressed by the compressor may be supplied to a cathode 21 of the fuel cell stack 20, and the hydrogen stored in the hydrogen supply unit 30 may be supplied to an anode 23 of the fuel cell stack 20 through a hydrogen supply line. A hydrogen supply valve 31 and an ejector 32 may be provided in the hydrogen supply line.

In a recirculation line 41 in which the gas (hydrogen) discharged from the fuel cell stack 20 recirculates to the fuel cell stack, a water trap 50 is provided to remove condensate water contained in the hydrogen which is the recirculating gas, a drain valve 61 is provided to drain the condensate water from the water trap, a gas discharge valve 70 is provided to discharge the gas if necessary, and a relief valve 50 is provided to release overpressure in the recirculation line 41.

In the related art as described above, the fuel cell system has the mechanical relief valve 50 provided separately from the gas discharge valve 70 or the drain valve 61 to release overpressure in the system. However, the configuration provided with the separate relief valve 50 may an increase in costs and complex structures.

Accordingly, there is a need for an integrated valve which is implemented by incorporating the function of the relief valve into the valve 70 for discharging gas in the system or the valve 61 for discharging condensate water, and thus is capable of appropriately performing a process of discharging a small amount of gas during normal operation and a process of discharging a large amount of gas in the event of overpressure.

SUMMARY

The present disclosure provides a discharge valve which is configured as a single valve and operates as a valve in the related art which discharges gas to improve a utilization rate of fuel in a fuel cell system and adjust hydrogen concentration, and as a relief valve which discharges gas to release overpressure in the event of the overpressure.

An exemplary embodiment of the present disclosure provides a discharge valve provided in a recirculation line through which gas discharged from a fuel cell stack recirculates to the fuel cell stack, the discharge valve being configured to open or close a discharge line through which a fluid in the recirculation line is discharged, the discharge valve may include: a valve body connected to the discharge line; a drive part disposed in the valve body to be movable vertically; and a diaphragm coupled to a lower end of the drive part and configured to selectively open or close the discharge line based on the vertical movement of the drive part, in which the drive part is provided to switch between a closed state in which the discharge line is closed by the diaphragm, a first opened state in which the discharge line is opened to a first opening degree, and a second opened state in which the discharge line is opened to a second opening degree greater than the first opening degree.

Another exemplary embodiment of the present disclosure provides a discharge valve configured to open or close a discharge line through which a fluid is discharged, the discharge valve may include: a valve body connected to the discharge line; a drive part provided in the valve body to be movable vertically; and a diaphragm coupled to a lower end of the drive part and configured to selectively open or close the discharge line based on the vertical movement of the drive part, in which the drive part is provided to switch between a closed state in which the discharge line is closed by the diaphragm, a first opened state in which the discharge line is opened to a first opening degree, and a second opened state in which the discharge line is opened to a second opening degree larger than the first opening degree.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
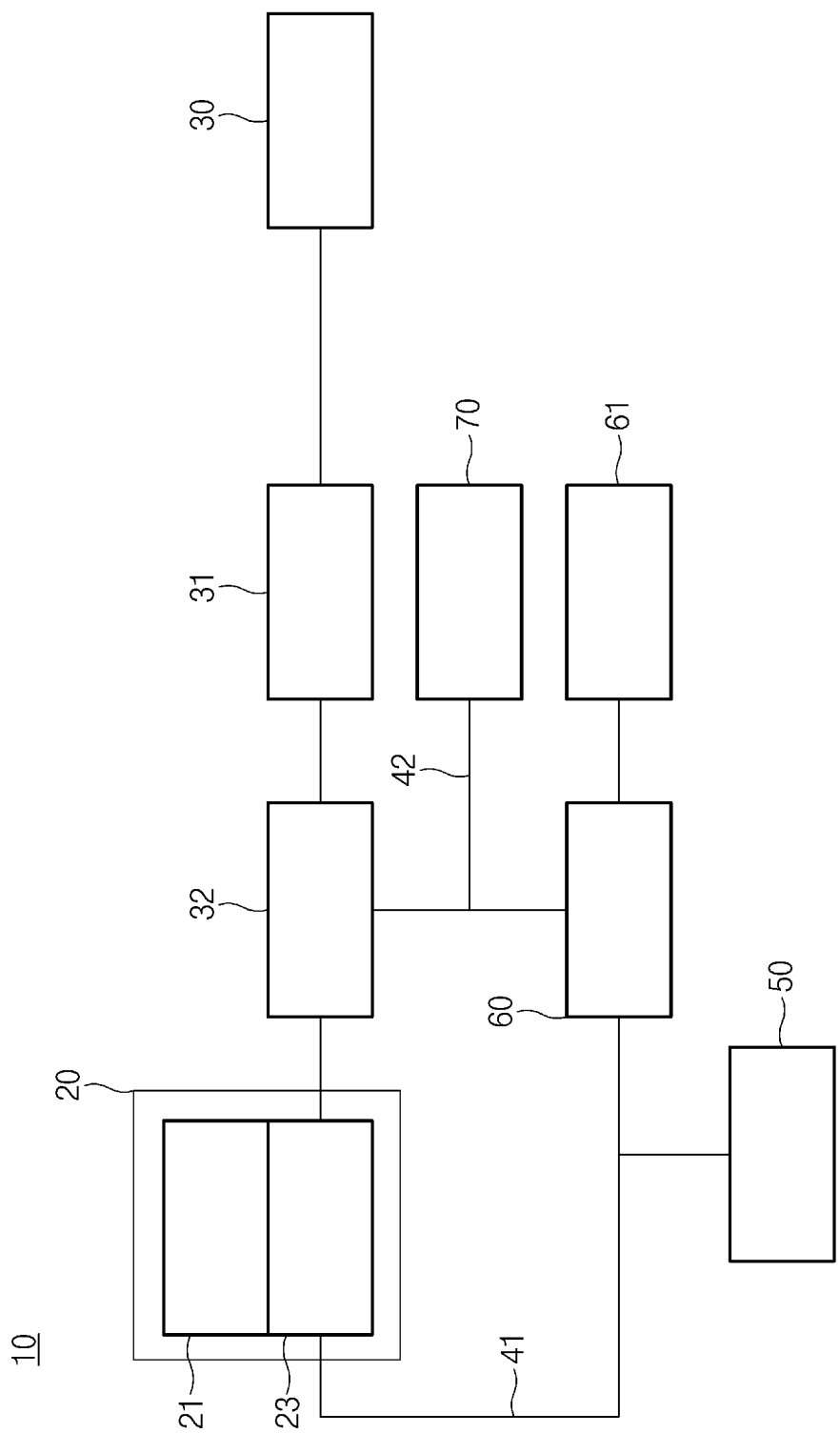
FIG. 1 is a view illustrating an example of a fuel cell system according to the related art applied to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described below in detail with reference to the accompanying drawings.

First, the exemplary embodiments described below are exemplary embodiments suitable for understanding technical features of a discharge valve according to the present disclosure. However, the present disclosure is not limitedly applied to the exemplary embodiments described below, the technical features of the present disclosure are not limited by the exemplary embodiment described herein, and various modifications can be implemented within the technical scope of the present disclosure.

A gas discharge valve 70 may include a housing 71, a core 73 disposed in the housing 71, and a coil 72 disposed between the core 73 and the housing 71. In addition, the gas discharge valve 70 may include a plunger 74 disposed in the housing 71 to be movable by the applied power, a spring 75 configured to elastically press the plunger 74 downward, and a diaphragm 76 coupled to a lower end of the plunger 74 and configured to open or close a discharge line 42. The discharge line 42 may include an inlet port 43 through which gas flows toward the gas discharge valve 70, and a discharge port 44 configured to discharge the gas to the outside by communicating with the inlet port 43 when the gas discharge valve 70 is opened.

Figure 2:
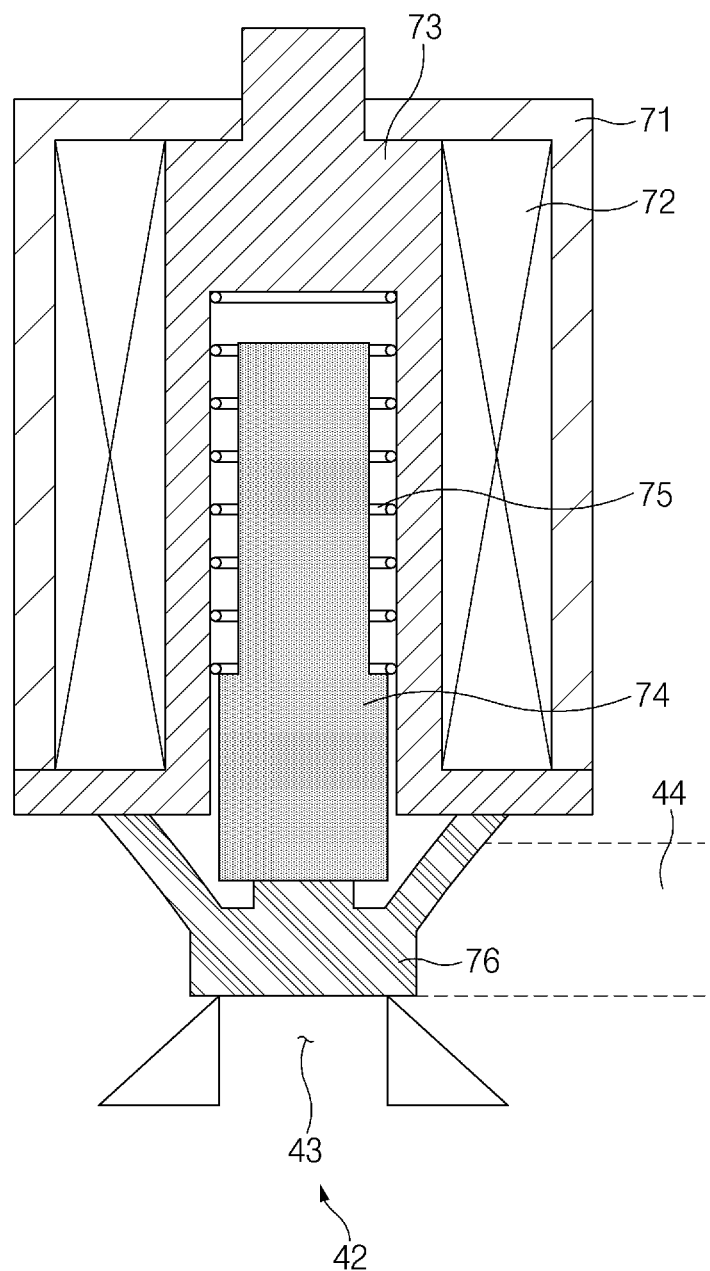
FIG. 2 is a view illustrating a closed state of a discharge valve in the related art.
Figure 3:
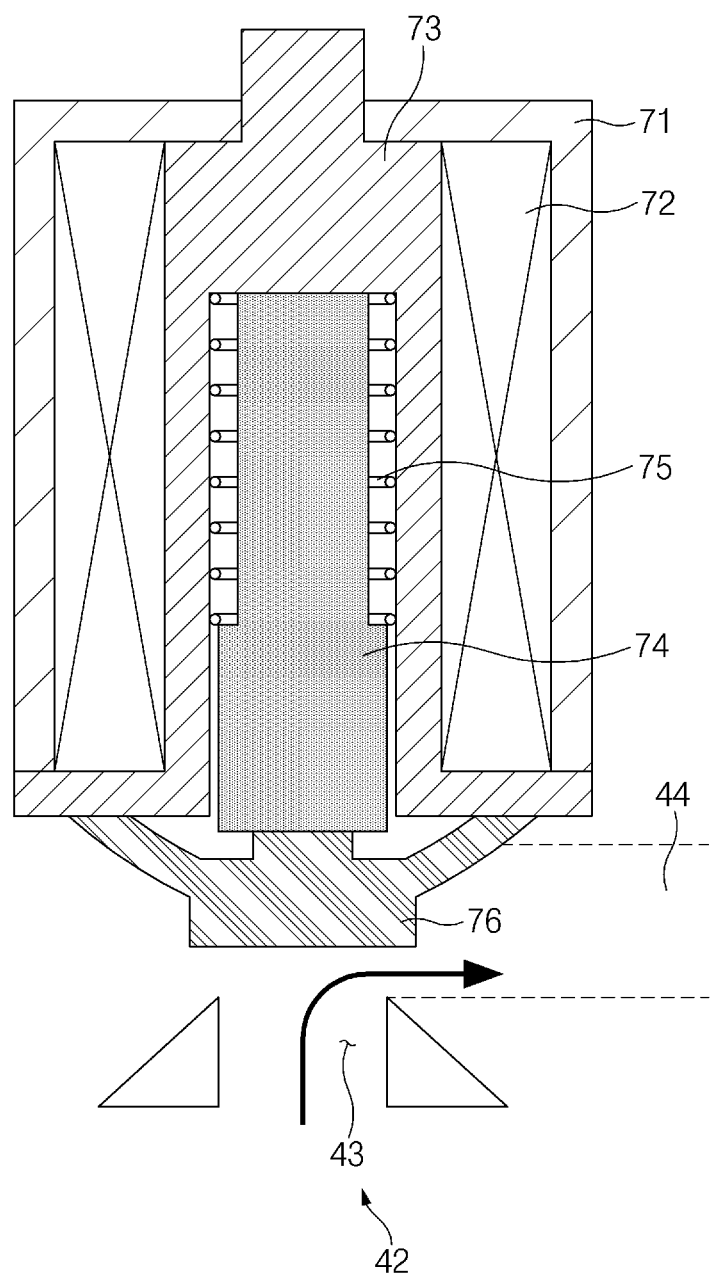
FIG. 3 is a view illustrating an opened state of the discharge valve in the related art.

Referring to FIG. 2, in a closed state, the spring 75 may press the plunger 74 toward the inlet port 43, and thus the diaphragm 76 may block the inlet port 43, to prevent discharge of the gas. Referring to FIG. 3, when the power is applied, the plunger 74 and the diaphragm 76 move upward by overcoming elastic force of the spring 75, thus opening the discharge line 42. In particular, the inlet port 43 and the discharge port 44 communicate with each other, such that the gas may flow to the outside.

In the case of the gas discharge valve 70 in the related art, a flow rate of the discharged gas is fixed, as illustrated in FIGS. 2 and 3. The gas discharge valve 70 with a high discharge flow rate is advantageous in releasing overpressure in the recirculation line 41, but during normal operation, a utilization rate of fuel may deteriorate or it may be difficult to control hydrogen concentration in the fuel cell system 10. On the contrary, the gas discharge valve 70 with a low discharge flow rate has a problem in that it is difficult to quickly release the overpressure occurring in the recirculation line 41.

Accordingly, the present disclosure provides an improved discharge valve implemented by incorporating a relief function into the valve in the related art, such that the discharge valve is able to discharge gas at a low flow rate under a normal operation condition of the fuel cell system 10, and to discharge gas at a high flow rate when overpressure occurs in the recirculation line 41. Hereinafter, a discharge valve 100 according to the present disclosure will be described.

The discharge valve 100 according to the present disclosure may be configured to open or close the discharge line 42 through which the fluid is discharged. For example, when the discharge valve 100 is used for the fuel cell system, the discharge valve 100 may be provided in the recirculation line 41 (see FIG. 1) through which the gas discharged from the fuel cell stack recirculates to the fuel cell stack, and the discharge valve 100 may be configured to open or close the discharge line 42 through which the fluid in the recirculation line 41 is discharged. In particular, the discharge line 42 may include the inlet port 43 through which gas flows toward the discharge valve 100, and the discharge port 44 configured to discharge the gas to the outside by communicating with the inlet port 43 when the discharge valve 100 is opened.

Figure 4:
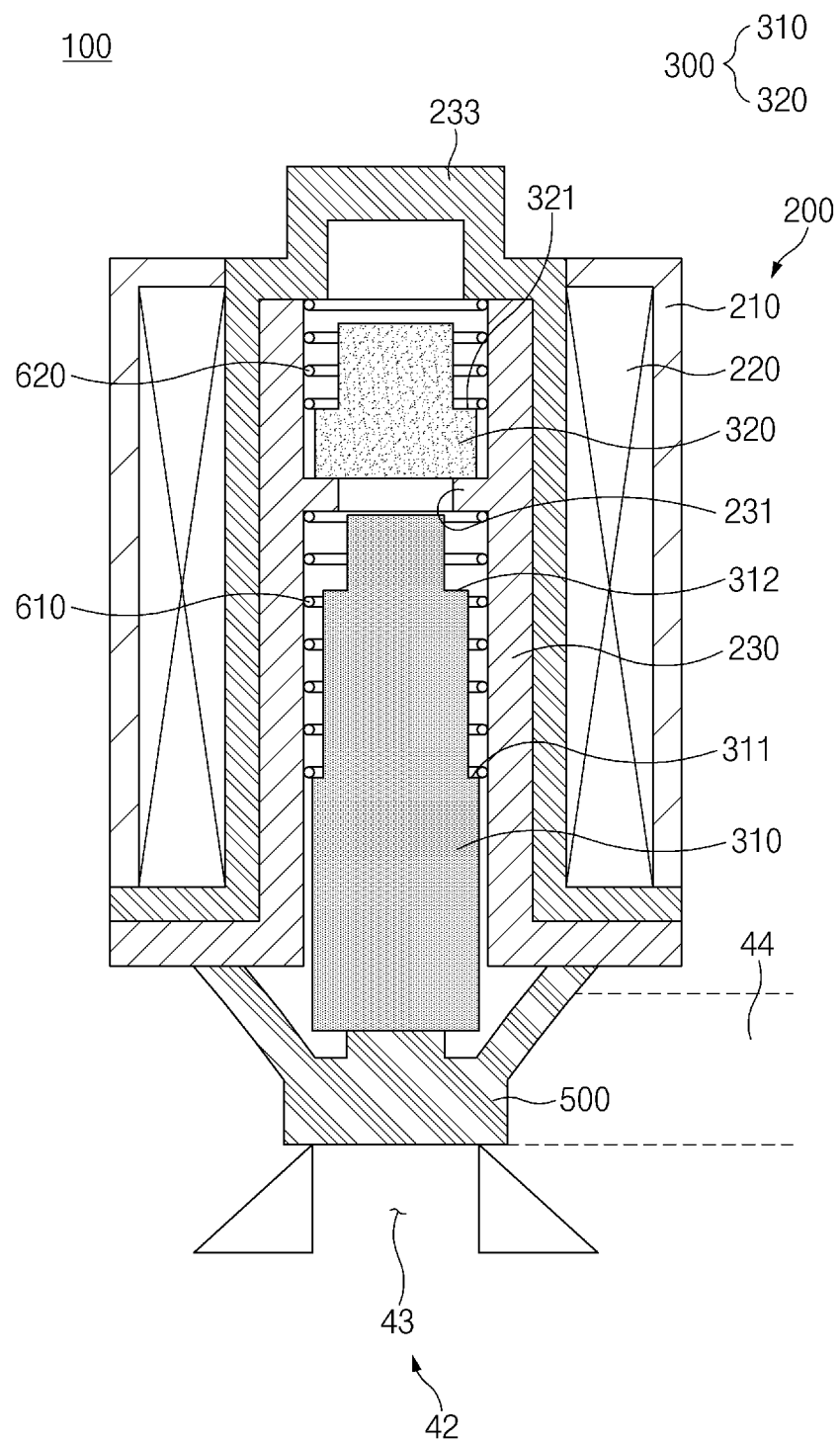
FIG. 4 is a view illustrating a closed state of a discharge valve according to the present disclosure.
Figure 5:
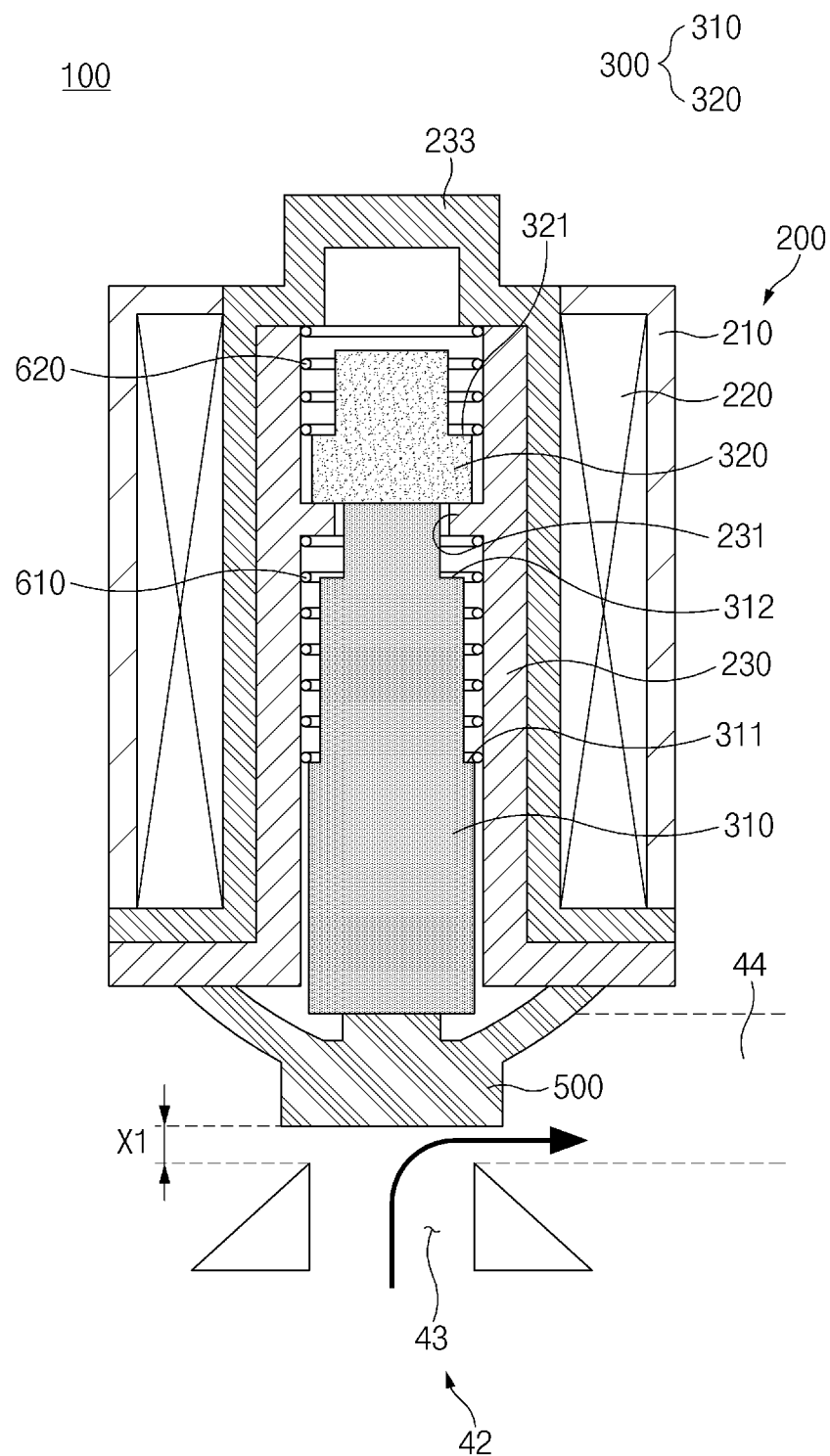
FIG. 5 is a view illustrating a first opened state of the discharge valve according to the present disclosure.
Figure 6:
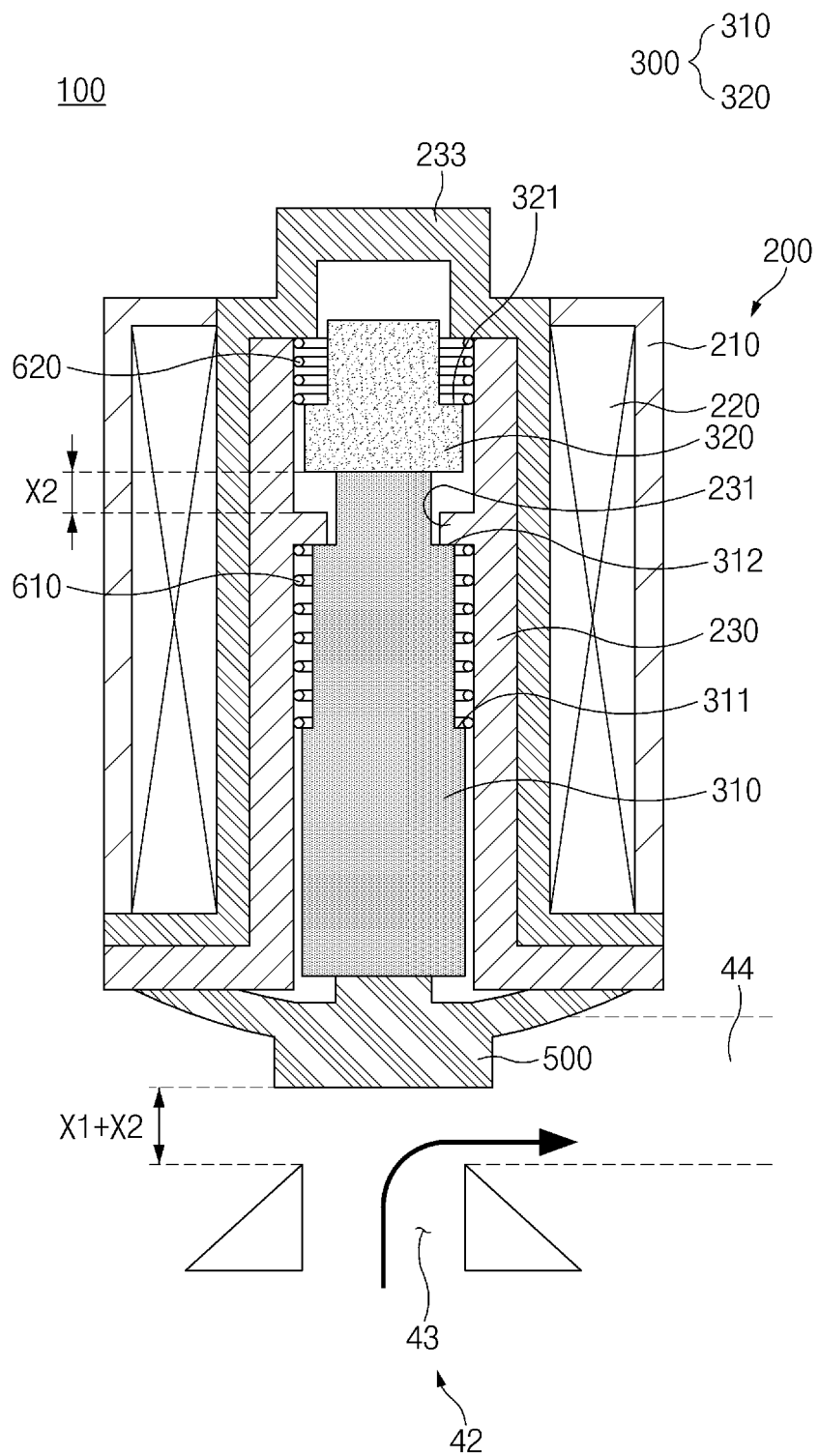
FIG. 6 is a view illustrating a second opened state of the discharge valve according to the present disclosure.

Referring to FIGS. 4 to 6, the discharge valve 100 according to the present disclosure may include a valve body 200, a drive part 300, and a diaphragm 500. The valve body 200 may be connected to the discharge line 42. The drive part 300 may be disposed in the valve body 200 to be movable vertically (e.g., upward and downward). The diaphragm 500 may be coupled to a lower end of the drive part 300 and provided to selectively open or close the discharge line 42 based on the vertical movement of the drive part 300. Particularly, the vertically directions are defined based on the drawings, the upward direction refers to a direction in which the drive part 300 moves to open the discharge line 42, and the downward direction refers to a direction in which the diaphragm 500 presses the inlet port 43 in the discharge line 42 to close the discharge line 42.

The drive part 300 is provided to switch between a closed state (see FIG. 4) in which the discharge line 42 is closed by the diaphragm 500, a first opened state (see FIG. 5) in which the discharge line 42 is opened to a first opening degree, and a second opened state (see FIG. 6) in which the discharge line 42 is opened to a second opening degree greater than the first opening degree. Specifically, in the closed state, the diaphragm 500 may close the discharge line 42 by blocking the inlet port 43. In the first opened state, the lower end of the diaphragm 500 may be moved upward by a predetermined distance X1 by the movement of the drive part 300, to open the discharge line 42 to the first opening degree. In the second opened state, the lower end of the diaphragm 500 may be moved upward by a predetermined distance X1+X2 by the movement of the drive part 300, to open the discharge line 42 to the second opening degree greater than the first opening degree.

As described above, the discharge valve 100 according to the present disclosure may adjust the flow rate of the gas discharged through the discharge line 42 by adjusting the valve opening degrees in multiple stages. Specifically, when the discharge valve 100 according to the present disclosure is applied to the fuel cell system, the discharge valve 100 may be opened to be in the first opened state to discharge the gas at a low flow rate if necessary to improve a utilization rate of fuel and ensure conformability in respect to hydrogen concentration while the system operates normally. In addition, when the overpressure occurs in the recirculation line 41, the discharge valve 100 may be opened to be in the second opened state to rapidly release the overpressure.

Therefore, the discharge valve 100 according to the present disclosure, which is configured as a single valve, may operate both as a valve in the related art which discharges gas to improve a utilization rate of fuel in the fuel cell system and control hydrogen concentration, and as a relief valve which discharges gas to release the overpressure in the event of the overpressure. The drive part 300 may switch from the closed state to the first opened state when the power is applied, and the drive part 300 may switch from the first opened state to the second opened state by a fluid pressure in the recirculation line 41 when the fluid pressure is equal to or greater than a reference pressure.

In particular, the fluid pressure in the recirculation line 41 may be equal to or greater than the reference pressure when the overpressure occurs in the system. When it is necessary to discharge the gas to improve a utilization rate of fuel while the system operates, the discharge valve 100 may be opened to be in the first opened state by the applied power to discharge the gas at a low flow rate. Further, when the overpressure occurs in the system, the drive part 300 and the diaphragm 500 may be moved by a pressure of the gas flowing to the inlet port 43 of the discharge line 42, to open the discharge valve 100 to be in the second opened state to discharge the gas at a high flow rate.

Specifically, the drive part 300 may include a plunger 310 and a core 320. The plunger 310 may be disposed in the valve body 200 to be movable upward and downward. The plunger 310 may be disposed above the diaphragm 500. In addition, the core 320 may be disposed in the valve body 200 to be movable upward and downward. The core 320 may be disposed above the plunger 310. In particular, in the closed state, the core 320 may be disposed above and spaced apart from the plunger 310.

Meanwhile, the discharge valve 100 according to the present disclosure may further include a first elastic part 610 and a second elastic part 620. The first elastic part 610 elastically presses the plunger 310 downward. The first elastic part 610 may be compressed as the plunger 310 is moved upward by the applied power. The second elastic part 620 elastically presses the core 320 downward. The second elastic part 620 may be compressed as the core 320 is moved upward by being pressed by the upward movement of the plunger 310 by the fluid pressure in the recirculation line 41 when the fluid pressure is equal to or greater than the reference pressure.

In other words, when the fluid pressure in the recirculation line 41 is equal to or greater than the reference pressure, the diaphragm 500 and the plunger 310 may be moved upward by the fluid pressure, and the plunger 310 may press the core 320 with pressing force that overcomes the elastic force of the second elastic part 620, to thus move the core 320. Therefore, the opening degree may be increased in the second opened state in comparison with the first opened state in which only the plunger 310 is moved. When the pressure of the fluid is less than the reference pressure, the second elastic part 620 is not compressed even though the power is applied, and as a result, the plunger 310 may be moved to a lower end of the core 320.

The valve body 200 may include a sleeve 230 configured to receive the drive part 300, and a housing 210 disposed outside the sleeve 230 to interpose the coil 220 between the sleeve 230 and the housing 210. The sleeve 230 may include a protruding portion 231 that protrudes from an inner surface of the sleeve 230 and configured to support the lower end of the core 320. In addition, the sleeve 230 may further include a cap portion 233 provided at an upper end of the sleeve 230.

Further, an upper end of the first elastic part 610 may be supported by the protruding portion 231, and a lower end of the first elastic part 610 may be supported by a support projection 311 formed in a stepped manner on the plunger 310. Therefore, the first elastic part 610 may press the plunger 310 downward when the power is not applied. A stepped portion 312 may be formed on an outer surface of the plunger 310 and may restrict an upward movement distance of the plunger 310 when the plunger 310 presses the core 320 in the second opened state.

An upper end of the second elastic part 620 may be supported by the cap portion 233, and a lower end of the second elastic part 620 may be supported by a stepped projection 321 formed in a stepped manner on the core 320. Therefore, when no overpressure occurs (e.g., the pressure of the fluid is less than the reference pressure), the second elastic part 620 may press the core 320 downward.

When the plunger 310 of the drive part 300 is moved to a lowermost side by being pressed downward by the first elastic part 610, the discharge valve may be in the closed state. In particular, the discharge line 42 may be closed by the diaphragm 500, to prevent the gas (fluid) from flowing to the outside. When the plunger 310 is moved upward by the applied power and then the upward movement of the plunger 310 is restricted by the core 320 supported by the second elastic part 620, the discharge valve may be in the first opened state. In particular, the discharge line 42 may be opened to the first opening degree to discharge the fluid to the outside at a low flow rate.

Further, when the core 320 is moved to an uppermost side by being pressed by the upward movement of the plunger 310 by the fluid pressure, the discharge valve may be in the second opened state. In particular, the discharge line 42 may be opened to the second opening degree to discharge the fluid to the outside at a high flow rate. Therefore, it may be possible to release the overpressure in the recirculation line 41. Thereafter, when the pressure of the fluid is less than the reference pressure, the plunger 310 and the core 320 may be moved downward, such that the discharge valve may be in the first opened state or the closed state.

As described above, the discharge valve according to the present disclosure may adjust the flow rate of the gas discharged through the discharge line by adjusting the valve opening degrees in multiple stages. For example, when the discharge valve is applied to the fuel cell system, the discharge valve may be opened to be in the first opened state to discharge the gas at a low flow rate if necessary to improve a utilization rate of fuel and ensure conformability in respect to hydrogen concentration while the system operates normally. In addition, when the overpressure occurs in the recirculation line, the discharge valve may be opened to be in the second opened state to quickly release the overpressure.

Therefore, the discharge valve according to the present disclosure, which is configured as a single valve, may operate both as a valve in the related art which discharges gas to improve a utilization rate of fuel in the fuel cell system and control hydrogen concentration, and as a relief valve which discharges gas to release the overpressure in the event of the overpressure.

While the specific exemplary embodiments of the present disclosure have been described above, the spirit and scope of the present disclosure are not limited to the specific exemplary embodiments, and those skilled in the art to which the present disclosure pertains may variously modify and change the present disclosure without departing from the subject matter of the present disclosure disclosed in the claims.

The discharge valve according to the present disclosure may adjust the flow rate of the gas discharged through the discharge line by adjusting the valve opening degrees in multiple stages. For example, when the discharge valve is applied to the fuel cell system, the discharge valve may be opened to be in the first opened state in order to discharge the gas at a low flow rate if necessary to improve a utilization rate of fuel and ensure conformability in respect to hydrogen concentration while the system operates normally. In addition, when the overpressure occurs in the recirculation line, the discharge valve may be opened to be in the second opened state to quickly release the overpressure.

Therefore, the discharge valve according to the present disclosure, which is configured as a single valve, may operate both as a valve in the related art which discharges gas to improve a utilization rate of fuel in the fuel cell system and control hydrogen concentration, and as a relief valve which discharges gas to release the overpressure in the event of the overpressure, thereby reducing costs and simplifying the configuration of the fuel cell system.

What is claimed is:

1. A discharge valve provided in a recirculation line through which gas discharged from a fuel cell stack recirculates to the fuel cell stack, the discharge valve being configured to open or close a discharge line through which a fluid in the recirculation line is discharged, the discharge valve comprising:
   a valve body connected to the discharge line;
   a drive part disposed in the valve body to be movable vertically; and
   a diaphragm coupled to a lower end of the drive part and configured to selectively open or close the discharge line based on the vertical movement of the drive part,
   wherein the drive part is provided to switch between a closed state in which the discharge line is closed by the diaphragm, a first opened state in which the discharge line is opened to a first opening degree, and a second opened state in which the discharge line is opened to a second opening degree greater than the first opening degree,
   wherein the drive part includes:
      a plunger provided in the valve body to be movable vertically and disposed above the diaphragm; and
      a core provided in the valve body to be movable vertically and disposed above the plunger,
   wherein the valve body includes:
      a sleeve configured to receive the drive part; and
      a housing disposed outside the sleeve to interpose a coil between the sleeve and the housing, and
   wherein the sleeve includes a protruding portion protruding from an inner surface of the sleeve and configured to support a lower end of the core.

2. The discharge valve of claim 1, wherein the drive part switches from the closed state to the first opened state by applied power, and the drive part switches from the first opened state to the second opened state by a fluid pressure in the recirculation line when the fluid pressure is equal to or greater than a reference pressure.

3. The discharge valve of claim 2, further comprising:
   a first elastic part configured to elastically press the plunger downward and configured to be compressed as the plunger is moved upward by the applied power; and
   a second elastic part configured to elastically press the core downward and configured to be compressed as the core is moved upward by being pressed by the upward movement of the plunger by the fluid pressure in the recirculation line when the fluid pressure is equal to or greater than the reference pressure.

4. The discharge valve of claim 3, wherein the core is disposed above and spaced apart from the plunger in the closed state,
   wherein the discharge valve is in the closed state when the plunger of the drive part is moved to a lowermost side by being pressed downward by the first elastic part,
   wherein the discharge valve is in the first opened state when the plunger is moved upward by the applied power and then the upward movement of the plunger is restricted by the core supported by the second elastic part, and
   wherein the discharge valve is in the second opened state when the core is moved to an uppermost side by being pressed by the upward movement of the plunger by the fluid pressure.

5. The discharge valve of claim 4, wherein an upper end of the first elastic part is supported by the protruding portion, and a lower end of the first elastic part is supported by a support projection formed in a stepped manner on the plunger.

6. The discharge valve of claim 5, wherein the sleeve further includes a cap portion provided at an upper end of the sleeve, and wherein an upper end of the second elastic part is supported by the cap portion, and a lower end of the second elastic part is supported by a stepped projection formed in a stepped manner on the core.

7. A discharge valve configured to open or close a discharge line through which a fluid is discharged, the discharge valve, comprising:
   a valve body connected to the discharge line;
   a drive part disposed in the valve body to be movable vertically; and
   a diaphragm coupled to a lower end of the drive part and configured to selectively open or close the discharge line based on the vertical movement of the drive part,
   wherein the drive part is provided to switch between a closed state in which the discharge line is closed by the diaphragm, a first opened state in which the discharge line is opened to a first opening degree, and a second opened state in which the discharge line is opened to a second opening degree greater than the first opening degree,
   wherein the drive part includes:
      a plunger provided in the valve body to be movable vertically and disposed above the diaphragm; and
      a core provided in the valve body to be movable vertically and disposed above the plunger,
   wherein the valve body includes:
      a sleeve configured to receive the drive part; and
      a housing disposed outside the sleeve to interpose a coil between the sleeve and the housing, and
   wherein the sleeve includes a protruding portion protruding from an inner surface of the sleeve and configured to support a lower end of the core.

* * * * *